United States Patent [19]

Pelzl

[11] Patent Number: 5,019,947

[45] Date of Patent: May 28, 1991

[54] CODING DEVICE FOR PRINTED CIRCUIT CARDS WHICH CAN BE INSERTED INTO A PRINTED CIRCUIT CARD RACK

[75] Inventor: Leo Pelzl, Holzkirchen, Fed. Rep. of Germany

[73] Assignee: Siemens Aktiengesellschaft, Munich, Fed. Rep. of Germany

[21] Appl. No.: 827,062

[22] Filed: Feb. 7, 1986

[30] Foreign Application Priority Data

Mar. 28, 1985 [DE] Fed. Rep. of Germany ....... 3511337

[51] Int. Cl.[5] ............................................ H02B 1/02

[52] U.S. Cl. .................................. 361/415; 361/412; 361/413

[58] Field of Search ...................... 361/415, 412, 413; 339/184 M, 186 M

[56] References Cited

U.S. PATENT DOCUMENTS

| | | | |
|---|---|---|---|
| 2,958,014 | 10/1960 | Blain | 339/184 M |
| 3,191,097 | 6/1965 | Dano et al. | 361/415 X |
| 3,733,523 | 5/1973 | Reynolds et al. | 361/415 |
| 4,064,443 | 9/1977 | Champagne | 339/186 M X |
| 4,223,973 | 9/1980 | Tamburro | 339/186 M |
| 4,350,409 | 9/1982 | Kato et al. | 339/186 M |
| 4,354,724 | 10/1982 | Jarmy | 339/186 R |
| 4,379,606 | 4/1983 | Clark et al. | 339/184 M X |
| 4,598,336 | 7/1986 | Hehl | 361/415 X |

FOREIGN PATENT DOCUMENTS

| | | | |
|---|---|---|---|
| 2144768 | 3/1973 | Fed. Rep. of Germany | 339/186 M |

*Primary Examiner*—Leo P. Picard

*Attorney, Agent, or Firm*—Hill, Van Santen, Steadman & Simpson

[57] ABSTRACT

A coding device for printed circuit cards which are insertable into a printed circuit card rack wherein coding elements 3 are provided at the front upper and lower horizontally mounted subracks of a printed circuit card rack between the guide rails 2 and the coding elements comprise slots 4 which extend parallel to the guide rails 2. Webs 7 and 8 corresponding to the slots 4 are applied to the upper and lower end faces of the plug connection connector 5 as cooperating coding elements so as to provide that coding occurs as soon as the individual printed circuit cards are introduced into the rack.

5 Claims, 2 Drawing Sheets

CODING DEVICE FOR PRINTED CIRCUIT CARDS WHICH CAN BE INSERTED INTO A PRINTED CIRCUIT CARD RACK

BACKGROUND OF THE INVENTION

1. Field of the Invention

This invention relates in general to a coding device for printed circuit cards which are insertable into a printed circuit card rack and which are provided with a plug connection connector.

2. Description of the Prior Art

It is known to attach coding strips or rails to the plug connection connectors of insertable printed circuit cards and the coding strips or rails are provided with projections which point in the plug-in direction. A cooperating coding strip or rail is attached to the associated cooperating plug-in means and the cooperating coding strip or rail is provided with the depressions which mate to the projections. The form or arrangement of the projections and respectively the depressions differ for different printed circuit cards. This assures that the printed circuit cards are inserted into the printed circuit card rack at the right location.

There are disadvantages in the prior art type of arrangements in that individual codings do not become effective until the printed circuit card has been nearly entirely inserted into the rack and, thus, no visual control is obtained as to whether the proper printed circuit card has been selected. Also, the printed circuit cards require considerable force for plugging them into the printed circuit card rack and the codings are substantially stressed when the plug type connections engage and they can be damaged.

SUMMARY OF THE INVENTION

It is an object of the present invention to provide a coding device wherein good visual control is maintained as to whether the corresponding coding elements fit together before the printed circuit card is inserted.

For a coding device, this object is achieved in that coding elements are provided at the front upper and lower horizontal subracks of the printed circuit card rack with guide rails for the printed circuit cards and the coding elements comprise one or more slots which extend parallel to the guide rails and webs corresponding to the slots are applied to the upper and lower end faces of the plug connector as cooperating coding elements.

The coding device of the invention has the advantage that the coding can be immediately recognized by the user as to whether it is correct immediately when the printed circuit card is inserted. Thus, a possible false actuation of the coding is thus avoided. After the printed circuit card has been inserted, the coding mechanims is no longer mechanically stressed.

Another solution according to the object of the invention is that the coding elements are provided at the front upper and lower horizontal subracks of the printed circuit card rack between the guide rails of the printed circuit cards and these coding elements comprise one or more webs which extend parallel to the guide rails and that slots corresponding to the webs are applied to the upper and lower end faces of the plug connection connector as cooperating coding elements. This structure is the reverse of the first embodiment and has the same advantages.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure an in which:

DESCRIPTION OF THE PREFERRED EMBODIMENTS

Figure 1:
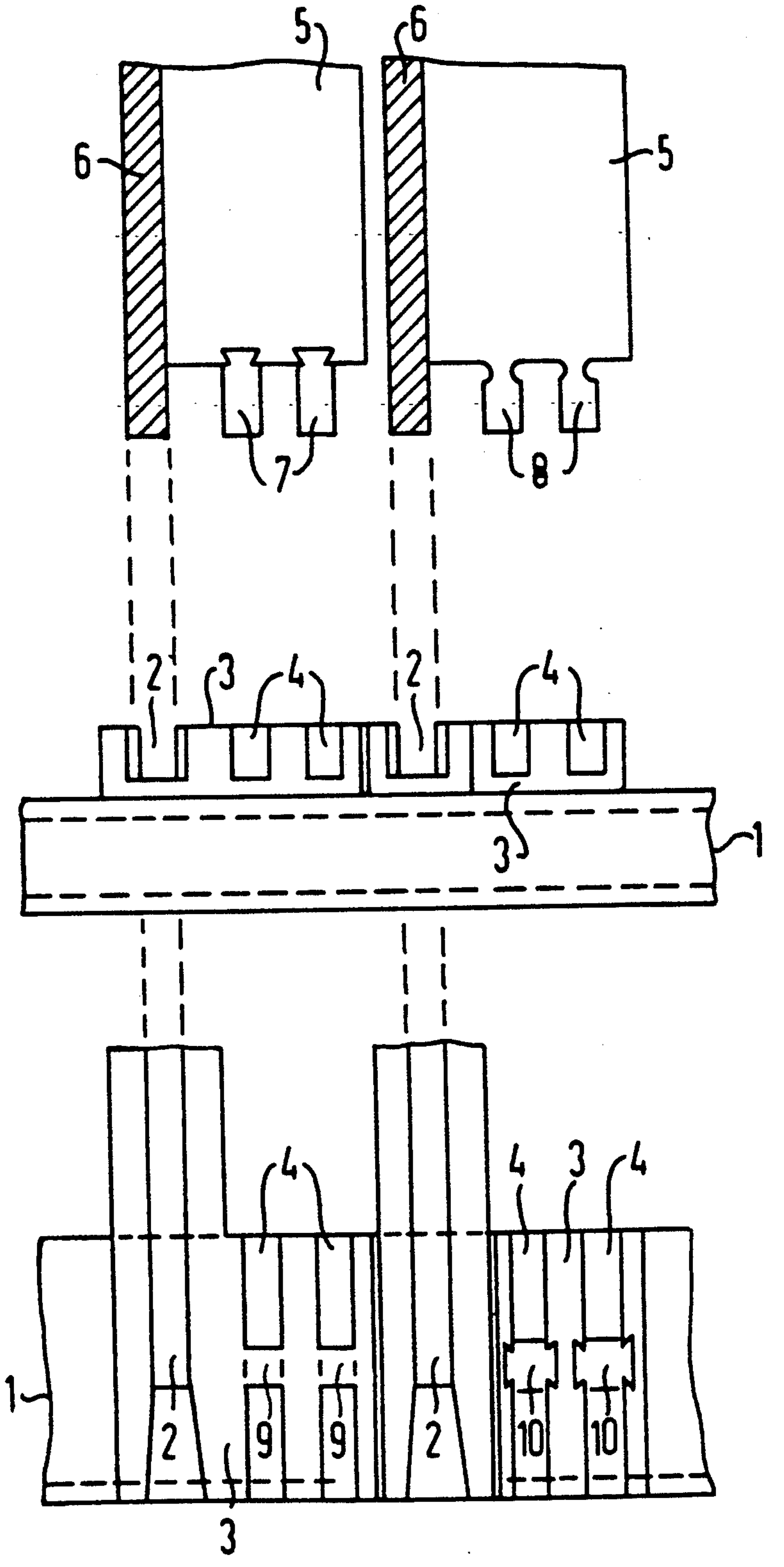
FIG. 1 illustrates a coding device wherein the plug connection connector is provided with webs and shows the printed circuit board and the subrack from the front in exploded position in the top two views and the lower view is a top plan view of the subrack.

The upper portion of FIG. 1 illustrates two partial front views of two printed circuit cards 6 showing the plug-in edge. The middle portion of FIG. 1 is a front plan view of the subrack with guide rails for receiving the printed circuit cards and the lower portion of FIG. 1 comprises a top plan view of the subrack illustrating the guide rails. The subrack 1 is a part of a printed circuit card rack which is not illustrated in greater detail. Guide rails 2 are attached to the subrack 1 and printed circuit boards 6 of the pluggable printed circuit cards are received into the guide rails 2 of the subrack. The spacing between the guide rails 2 depends on how the insertable printed circuit cards are equipped with equipment. In the exemplary embodiment coding elements 3 are mounted between the guide rails 2 and these coding elements in the exemplary embodiment comprise two slots 4. So as to enable coding between the printed circuit boards 6 and the rails, webs 7 and 8 which correspond to the slots 4 are applied to the plug connection connectors 5 of the printed circuit cards.

The coding basically occurs in that either as shown webs 7 and 8 are present at the plug connection connectors 2 and a web may be at different locations or no web may be present at all. Accordingly, the slots 4 of the coding element 3 must be opened or blocked. Blocking of the slots 4 occurs by means of interlocks 9 and 10 shown in the lower portion of FIG. 1. The interlocks for the coding elements 3 can be executed in different fashion. First, plastic interlocks 9 which can be subsequently broken off can be used or, alternatively, plastic locks 10 which can be subsequently introduced can be used. Also, two different embodiments for the webs 7 and 8 which are connected to the plug connection connectors may also be provided. First, subsequently insertable webs 7 can be attached to the plug connection connectors 5 of the printed circuit card 6 or, alternatively, webs 8 which can be subsequently broken off or cutoff can be attached to the plug connection connectors 5 of the printed circuit cards as illustrated.

Figure 2:
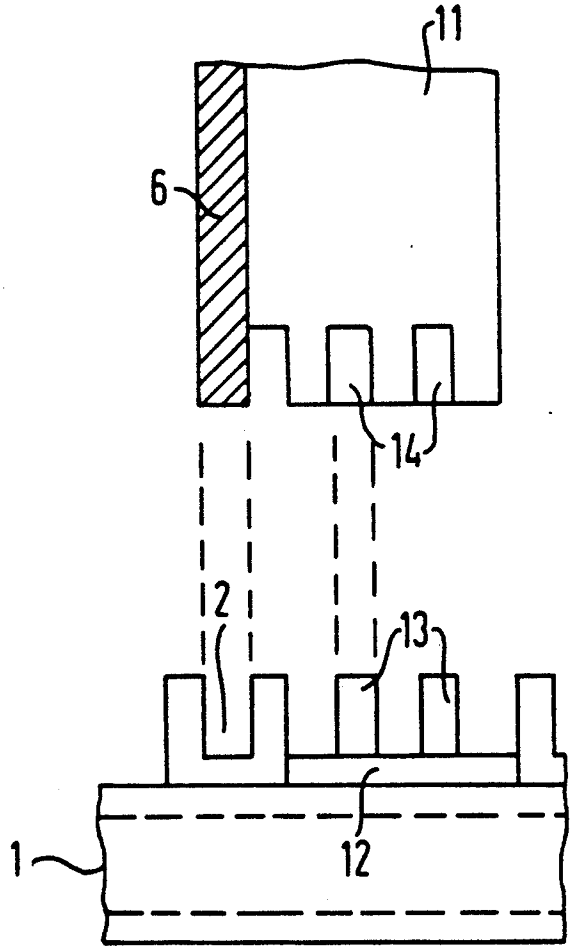
FIG. 2 illustrates an exploded view of a modification of the invention from the front wherein the plug connection connector is provided with slots.

FIG. 2 is a front view which illustrates second embodiment of the invention wherein the elements are inverted relative to FIG. 1. In FIG. 2, the coding element 12 comprises webs 13 between the guide rails 2 and the plug connection connector 11 of the printed circuit card 6 is provided with slots 14 into which the webs 13 can be received. With this proposed solution, one or both of the webs 13 can be removed or, respectively, interlocks can be inserted into the slots 14 of the plug connection connector 11 if desired.

It may be seen from the FIGS. 1 and 2 that the coding of the present invention becomes effective as soon as the printed circuit card is inserted. An erroneous coding is thus immediately recognizable to the user. Mechanical damage to the coding is thereby prevented since greater forces need not be exerted when introducing a component as normally occurs at the end just before the printed circuit card is plugged in. The coding device of the invention is composed of only a few parts such as insertable or breakaway webs and insertable and breakaway interlocks as coding means and the coding devices can be easily refitted without substantial setup work.

Although the invention has been described with respect to preferred embodiments, it is not to be so limited as changes and modifications can be made which are within the full intended scope of the invention as defined by the appended claims.

I claim as my invention:

1. A coding device for printed circuit cards insertable into a printed circuit card rack and provided with a plug connection connector, characterized in that coding elements (3) are mounted on the front upper and lower subracks (1) of the printed circuit card frame between the guide rails (2) for the printed circuit cards, said coding elements (3) formed with one or more slots (4) which extend parallel to said guide rails (2); and webs (7, 8) corresponding to said slots (4) are attached to the upper and lower end faces of said plug connection connector (5) to form cooperating coding elements which are receivable in said slots.

2. A coding device according to claim 1, characterized in that said coding element (3) which is provided between said upper and lower guide rails (2) is formed with a plurality of slots (4), and plastic interlocks (10) are insertable into said slots (4).

3. A coding device according to claim 1, characterized in that said webs (7, 8) which are attached to said plug connection connector (5) are formed with breakaway or cut-away members (8) or, as plug-shaped plastic parts (7) which can be selectively positioned in or removed from said slots 4.

4. A coding device according to claim 1, characterized in that said coding element (3) which is provided between said upper and lower guide rails (2) is formed with a plurality of slots (4), and detachable plastic interlocks (9) are mounted in said slots (4).

5. A coding mechanism for printed circuit cards insertable into a printed circuit card rack and provided with a plug connection connector, characterized in that coding elements (12) are mounted on the front upper and lower subracks (1) of the printed circuit card rack between the guide rails (2) for the printed circuit cards, said coding elements (12) formed with one or more webs (13) which extend parallel to said guide rails (2); and one or more slots (14) corresponding to said webs (13) are formed in the upper and lower end faces of said plug connection connector (11) as cooperating coding elements.

* * * * *